United States Patent
Nagasawa et al.

(10) Patent No.: US 6,917,169 B2
(45) Date of Patent: Jul. 12, 2005

(54) DRIVING CIRCUIT FOR ROTATING MOTOR IN FORWARD AND REVERSE DIRECTION

(75) Inventors: Kazumi Nagasawa, Aichi (JP); Toshiaki Ozaki, Aichi (JP); Norihiro Shimizu, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/788,273

(22) Filed: Mar. 1, 2004

(65) Prior Publication Data

US 2004/0217724 A1 Nov. 4, 2004

(30) Foreign Application Priority Data

Mar. 5, 2003 (JP) ..................... P. 2003-058773

(51) Int. Cl.[7] .............. H02P 1/00; H02P 1/22; H02P 1/40
(52) U.S. Cl. .......... 318/280; 318/281; 318/283; 318/286; 318/287; 318/288; 318/432; 318/434
(58) Field of Search ............... 318/138, 254, 318/430–439, 280–294, 256, 739, 700

(56) References Cited

U.S. PATENT DOCUMENTS

| | | | | |
|---|---|---|---|---|
| 4,705,997 A | * | 11/1987 | Juzswik | 388/811 |
| 4,985,666 A | * | 1/1991 | Nakabayashi | 318/434 |
| 4,988,931 A | * | 1/1991 | Tsukahara et al. | 318/293 |
| 5,552,684 A | | 9/1996 | Wada et al. | |
| 5,712,550 A | * | 1/1998 | Boll et al. | 318/434 |
| 6,271,978 B1 | * | 8/2001 | Block et al. | 360/46 |
| 6,274,993 B1 | * | 8/2001 | Itabashi et al. | 318/432 |
| 6,291,955 B1 | * | 9/2001 | Itabashi et al. | 318/434 |
| 6,329,777 B1 | * | 12/2001 | Itabashi et al. | 318/434 |
| 6,452,349 B1 | * | 9/2002 | Hahn et al. | 318/254 |
| 6,696,807 B2 | * | 2/2004 | Iwata et al. | 318/432 |

FOREIGN PATENT DOCUMENTS

JP       7-251749       10/1995

* cited by examiner

Primary Examiner—David Martin
Assistant Examiner—Tyrone Smith
(74) Attorney, Agent, or Firm—Morgan, Lewis & Bockius LLP

(57) ABSTRACT

A field effect transistor is provided between the ground and an H bridge circuit for rotating a motor in forward and reverse directions in a manner that the drain of the transistor is grounded and the gate thereof is coupled to a DC power source such as a battery serving as a bias source which supplies electric power to the H bridge circuit. Thus, when the DC power source such as a battery is reversely connected, the field effect transistor normally in an on state is turned off. A controller monitors the source voltage of the field effect transistor, and when the controller detects an excess current, the controller outputs a control signal to the high-side driver to prevent the supply of electric power to the motor.

6 Claims, 3 Drawing Sheets

FIG. 2A AT THE TIME OF CANCELING OF STANDBY
BRAKE MODE (STANDBY HIGH-LEVEL)
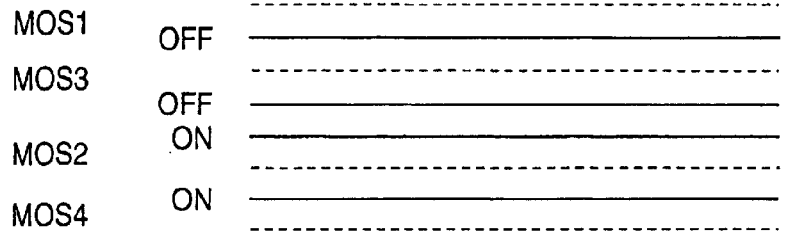
FIG. 2B AT THE TIME OF CANCELING OF STANDBY (FORWARD DIRECTION)
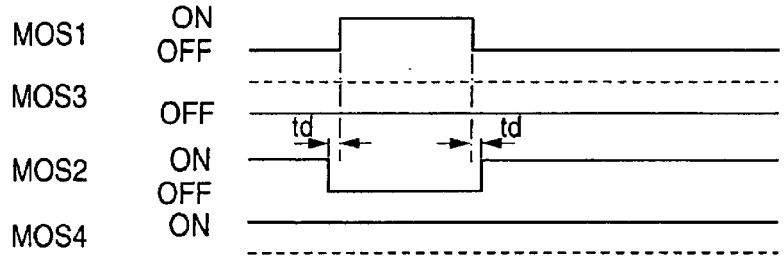
FIG. 2C AT THE TIME OF CANCELING OF STANDBY (REVERSE DIRECTION)
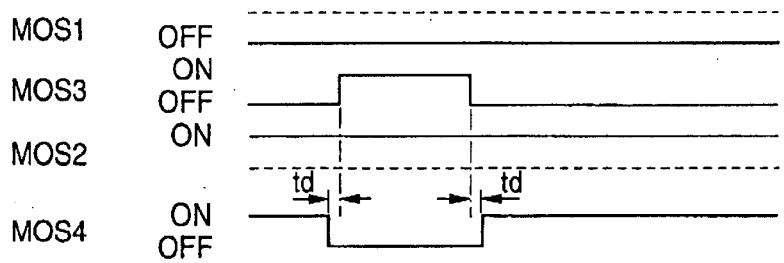
FIG. 2D AT THE TIME OF STANDBY
MOS1 TO MOS4 ARE TURNED (STANDBY LOW-LEVEL)
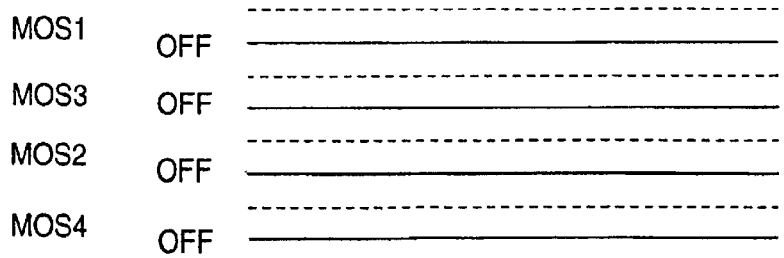

DRIVING CIRCUIT FOR ROTATING MOTOR IN FORWARD AND REVERSE DIRECTION

BACKGROUND OF THE INVENTION

The present invention relates to a reversible motor driving circuit capable of controlling a motor used for a power window etc. so as to rotate in forward and reverse directions.

FIG. 3 is a circuit diagram showing a related reversible motor driving circuit for rotating a motor in forward and reverse directions. The driving circuit shown in FIG. 3 uses two mechanical relays RLY1 and RLY2 for rotating a motor M in forward and reverse directions. The reversible motor driving circuit includes a CPU 10 which operates by being supplied with a logic power source $V_{DD}$ of 5 volt, for example, to control the motor M, an input I/F (interface) 20 for inputting an ON/OFF signal and a forward/reverse rotation signal etc. from a switch SW to the CPU 10, and a multiplex I/F 30 for inputting an ON/OFF signal and a forward/reverse rotation signal etc. transmitted from other electronic units through a LAN (local area network) etc. to the CPU 10.

The reversible motor driving circuit further includes a transistor Tr3, the mechanical relay RLY1 for the forward rotation, a transistor Tr4 and the mechanical relay RLY2 for the reverse rotation. Diodes D6 and D7 prevent reverse currents from flowing into the coils of the mechanical relays RLY1 and RLY2, respectively. Diodes D8 and D9 are free-wheel diodes for bypassing currents flowing into the collectors of the transistors Tr3 and Tr4 at the time of turning-off states of the transistors Tr3 and Tr4, respectively.

In such a circuit, in the case of rotating the motor M in the forward direction by the signal from the input I/F 20 or the multiplex I/F 30, the CPU 10 turns on the base of the transistor Tr3 and turns off the base of the transistor Tr4. As a result, the mechanical relay RLY1 is turned on and the mechanical relay RLY2 is turned off so that the forward current flows into the motor M. In contrast, in the case of rotating the motor M in the reverse direction, the CPU 10 turns off the base of the transistor Tr3 and turns on the base of the transistor Tr4. As a result, the mechanical relay RLY1 is turned off and the mechanical relay RLY2 is turned on so that the reverse current flows into the motor M. Further, in the case of stopping the motor M, the transistors Tr3 and Tr4 are turned off thereby to turn off the mechanical relays RLY1 and RLY2.

A shunt resistor R1 and a lock current detection circuit 50 are required for a load being locked such as a power window etc. of a vehicle. When a lock current representing a lock state of the motor M is detected, the lock current detection circuit 50 notifies the detection to the CPU 10, and the CPU 10 performs such a control of stopping the rotation of the motor M.

JP-A-7-251749 discloses a motor voltage detection circuit for detecting the ground fault of a motor or the abnormality of a motor driving device by using an H bridge circuit in a circuit for driving the motor.

The related reversible motor driving circuit using the mechanical relays shown in FIG. 3 has the following problems. (1) Since the mechanical relays are used, it is difficult to reduce the size and the weight of the reversible motor driving circuit. (2) The mechanical relays generate sound when their contact points close and open. (3) When the mechanical relay is turned off (when the contact point thereof opens), noise is generated due to an arc and so the CPU etc. may be badly influenced. (4) There is a limit in the durable number of times as to the contact points of the mechanical relays. (5) Since a large current continues to flow in the mechanical relay at the time of shortage of an electric wire or a load, the contact point may be fused.

These problems can be solved by using semiconductor elements as a switching driving device disclosed in JP-A-7-251749. However, in the semiconductor element such as an FET, the element is likely broken due to an excess current and hence it is required to provide a device for protecting the element from the excess current. In this respect, although JP-A-7-251749 provides a circuit for protecting the elements from the ground fault of the motor etc., there is no disclosure as to the protection of the semiconductor element etc. in the case of reversely connecting a DC power source such as a battery.

SUMMARY OF THE INVENTION

It is therefore an object of the present invention to provide a reversible motor driving circuit capable of protecting semiconductor elements and electric wires constituting an H bridge circuit for driving a motor from various kinds of abnormal currents caused by the ground fault of the motor, the reverse connection of a DC power source etc.

In order to achieve the above object, according to the present invention, there is provided a reversible motor driving circuit, comprising:

a motor, capable of rotating in forward and reverse directions;

two high-side semiconductor switching elements, coupled to a DC power source, and switching to selectively supply a current for forward rotation and a current for reverse rotation to the motor;

two low-side semiconductor switching elements, switching to selectively ground the current for forward rotation and the current for reverse rotation flowing into the motor; and a field effect transistor, provided between the ground and an H bridge circuit formed by the two high-side semiconductor switching elements and the two low-side semiconductor switching elements, wherein a drain of the field effect transistor is grounded and a gate thereof is coupled to the DC power source.

In the above configuration, the field effect transistor, which drain is grounded and which gate is coupled to the DC power source such as a battery serving as a bias source which supplies electric power to the H bridge circuit, is provided between the ground and the H bridge circuit for driving the motor in the forward and reverse directions. Thus, when the DC power source such as a battery is reversely coupled, the field effect transistor MOS normally in an on state is turned off, so that a current is prevented from flowing into the H bridge circuit and so the H bridge circuit can be protected.

Preferably, the reversible motor driving circuit further includes a high-side driver, applying an ON/OFF signal to the two high-side semiconductor switching elements so as to drive the two high-side semiconductor switching elements in accordance with the ON/OFF signal, a low-side driver, applying an ON/OFF signal to the two low-side semiconductor switching elements so as to drive the two low-side semiconductor switching elements in accordance with the ON/OFF signal and a controller, outputting to the high-side driver and the low-side driver a control signal instructing at least one of a forward rotation of the motor, a reverse rotation of the motor and a brake mode. The controller monitors a source voltage of the field effect transistor, and outputs a control signal instructing the brake mode to the high-side driver when the controller detects an excess current. The high-side driver applies an off signal to the two high-side semiconductor switching elements when the high-side driver receives the control signal instructing the brake mode.

In the above configuration, the controller monitors the source voltage of the field effect transistor and outputs the control signal to the high-side driver when detects an excess current thereby to prevent the supply of the electric power to the motor. Thus, the H bridge circuit can be protected from an excess current.

Preferably, the controller monitors the source voltage of the field effect transistor. The controller outputs a control signal for executing a preset post-processing regarding a lock current to at least one of the high-side driver and the low-side driver when the lock current representing a lock state of the motor is detected.

In the above configuration, the controller monitors the source voltage of the field effect transistor and outputs the control signal executing the preset post processing (for example, braking, reverse rotation, speed change by PWM control etc. depending on load used for the motor) after detection of the lock current to the high-side driver and/or the low-side driver when detects the lock current representing the lock state of the motor. Thus, the motor can cope with a load being locked.

Preferably, the reversible motor driving circuit further includes a transistor having a base to which an output voltage of the high-side driver is inputted and a collector to which an output voltage of the low-side driver is inputted.

In the above configuration, the transistors are provided each of which bases is applied with the voltage of an electric wire connecting between the high-side semiconductor switching elements and the high-side driver and each of which collectors is applied with the voltage of an electric wire connecting between the low-side semiconductor switching elements connected in series with the high-side semiconductor switching elements and the low-side driver. Thus, when an ON signal is applied to the high-side semiconductor switching elements, the transistors are turned on. Therefore, there is no case that an ON signal is applied to the low-side semiconductor switching elements simultaneously, so that it is possible to prevent the occurrence of a passing current which passes through the series connection of the low-side semiconductor switching elements and the high-side semiconductor switching elements but is not supplied to the motor.

Preferably, when rotating the motor in a forward direction or a reverse direction, the high-side driver turns on the high-side semiconductor switching element coupled in series with the low-side semiconductor switching element upon lapse of a predetermined time period after the low-side driver turns off the low-side semiconductor switching element.

In the above configuration, the high-side driver turns on the high-side semiconductor switching elements coupled in series with the low-side semiconductor switching elements upon lapse of the constant time period after the turning-off of the low-side semiconductor switching elements, so that there is no case that the low-side semiconductor switching elements and the high-side semiconductor switching elements being connected in series are turned on simultaneously. Thus, it is possible to prevent the generation of the passing current which passes through the series connection of the low-side semiconductor switching elements and the high-side semiconductor switching elements but is not supplied to the motor.

Preferably, when stopping rotation of the motor, the low-side driver turns on the low-side semiconductor switching element coupled in series with the high-side semiconductor switching element upon lapse of a constant time period after the high-side driver turns off the high-side semiconductor switching element.

In the above configuration, the low-side driver turns on the low-side semiconductor switching elements coupled in series with the high-side semiconductor switching elements upon lapse of the constant time period after the turning-off of the high-side semiconductor switching elements, so that there is no case that the low-side semiconductor switching elements and the high-side semiconductor switching elements being connected in series are turned on simultaneously. Thus, it is possible to prevent the generation of the passing current which passes through the series connection of the low-side semiconductor switching elements and the high-side semiconductor switching elements but is not supplied to the motor.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 2A to 2D are timing charts for explaining the typical operation of the reversible motor driving circuit according to the embodiment of the invention.

DETAILED DESCRIPTION OF THE PREFERRED EMBODIMENTS

The embodiment of the invention will be explained in detail with reference to the accompanying drawings.

Figure 1:
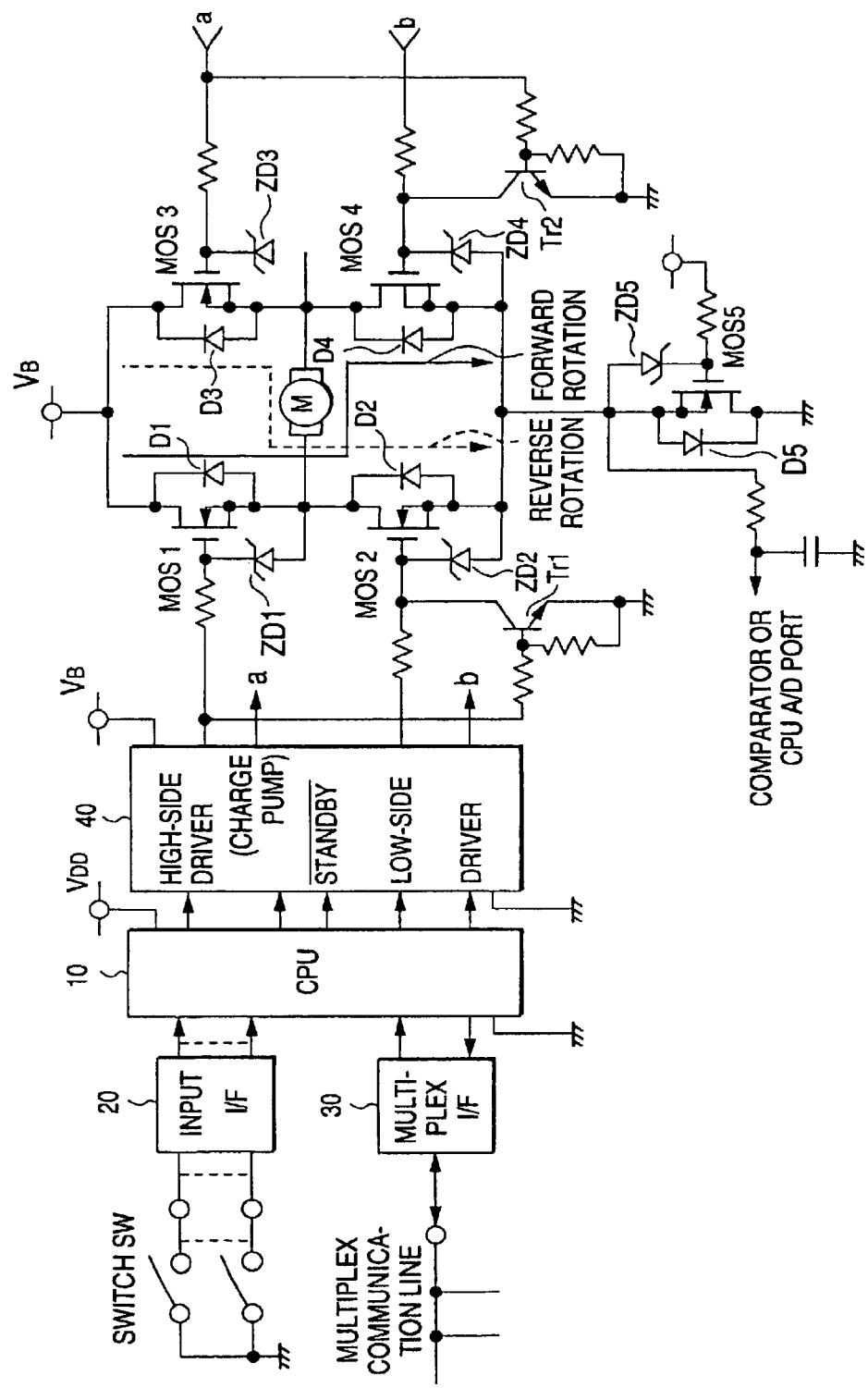
FIG. 1 is a circuit diagram showing a reversible motor driving circuit according to the embodiment of the invention.
Figure 3:
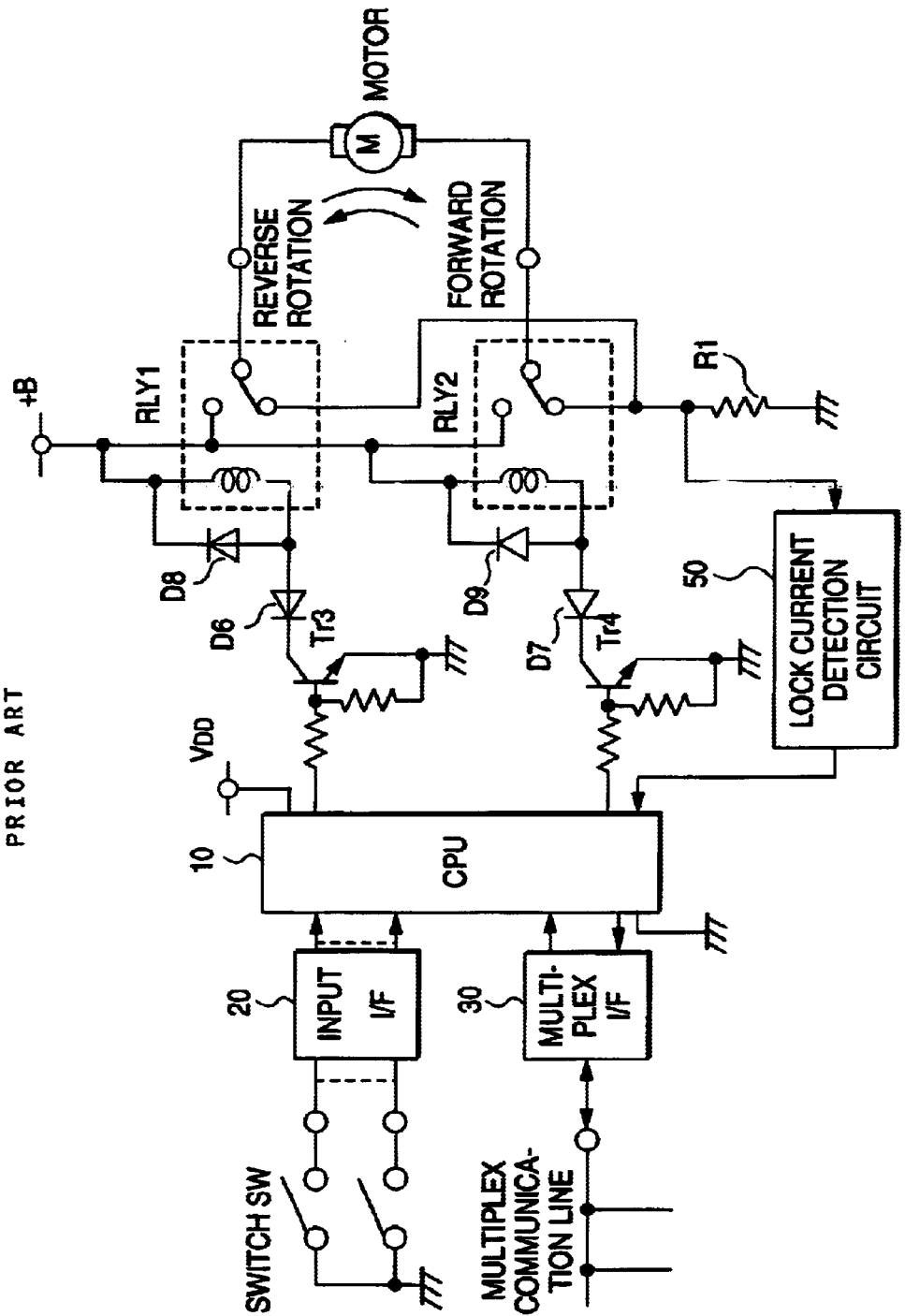
FIG. 3 a circuit diagram showing a reversible motor driving circuit of the related technique.

FIG. 1 is a circuit diagram showing a reversible motor driving circuit according to the embodiment of the invention. The reversible motor driving circuit includes a CPU 10, an input I/F 20, a multiplex I/F 30, a driver IC 40, a motor M, MOSFET's (metal oxide semiconductor field-effect transistors) 1 to 4 for an H bridge circuit, a MOSFET 5 for preventing a reverse current at the time of reversely connecting a DC power source, and transistors Tr1, Tr2 for preventing a passing current.

The input I/F 20 is an interface for inputting to the CPU 10 an ON/OFF signal and a forward/reverse rotation signal etc. which are generated by the operation of the switch SW by a user. The input I/F 20 also inputs to the CPU 10 a signal which is generated when a predetermined state is detected by a not-shown sensor etc. Such an input signal is a warning signal representing emergency stop, for example.

The multiplex I/F 30 is an interface for inputting to the CPU 10 an ON/OFF signal and a forward/reverse rotation signal etc. which are transmitted from other electronic units through a network such as a LAN etc. In the case where the reversible motor driving circuit according to the embodiment is used in order to drive vehicle parts such as a power window etc., signals communicated according to the protocol such as CAN (controller area network) or BEAN (body electronics area network) etc. are inputted into the CPU 10.

The CPU 10 operates by being supplied with a logic power source $V_{DD}$ of 5 volt, for example. The output of a battery power source is adjusted by a regulator and then inputted to the CPU as the logic power source $V_{DD}$, for example. The CPU 10 generates control signals based on the ON/OFF signal and the forward/reverse rotation signal etc. inputted from the input I/F 20 or the multiplex I/F 30 and outputs the control signals to the driver IC 40.

The driver IC 40 is a custom IC such as an ASIC (application specific integrated circuit) which is designed for driving the MOS1 to MOS4 constituting the H bridge circuit. The driver IC 40 includes a high-side driver with a charge pump for driving the MOS1, MOS3 and a low-side driver for driving the MOS2, MOS4. When each of the MOS1 and the MOS3 is constituted by a P channel MOSFET, the charge pump is not required.

The high-side driver turns on the gate of the MOS1 and turns off the gate of the MOS3 at the time of rotating the motor M in the forward direction, whilst turns off the gate of the MOS1 and turns on the gate of the MOS3 at the time of rotating the motor M in the reverse direction. The low-side driver turns off the gate of the MOS2 and turns on the gate of the MOS4 at the time of rotating the motor M in the forward direction. The low-side driver turns on the gate of the MOS2 and turns off the gate of the MOS4 at the time of rotating the motor M in the reverse direction. The driver IC 40 is provided with a standby terminal so that when a standby signal is inputted thereto from the CPU 10, the driver IC turns off the MOS1 to MOS4 to shift to the stop mode thereby to suppress an amount of a consumption current.

The motor M is a motor used for a door lock, a power window, a retractable mirror etc. of a vehicle but not limited thereto.

The MOS1 to MOS4 constitute the H bridge circuit in which the output of a DC power source such as a battery power source is inputted. The driver IC 40 performs the on/off control of the MOS1 to MOS4 thereby to rotate or stop the motor M and also rotate the motor M in the forward or reverse direction. An N channel MOSFET is preferably used for each of the MOS1 to MOS4 constituting the H bridge circuit. Since each of the MOS2 and MOS4 is formed as a common source type switching circuit in which the source is grounded, each of the MOS2 and NOS4 is turned on when the gate voltage thereof is set to a several tens volt. Since each of the MOS1 and MOS3 is formed as a source follower type switching circuit in which the source is coupled to the power source side, each of the MOS1 and MOS3 is not tuned on unless a voltage of several tens volt is applied to the gate thereof. Thus, the high-side driver of the driver IC 40 is provided with the charge pump circuit such as a converter.

The configuration of the H bridge circuit is not limited to the arrangement, and a P channel MOSFET may be used for each of the MOS1 and MOS3. In this case, although it is not necessary to boost by using the high-side driver, the switching speed of each of the MOS1 and MOS3 is lower than that in the case of using the N channel MODSET.

Parasitic diodes D1 to D4 are respectively provided at the MOS1 to MOS4 constitute the H bridge circuit so that these MOSFET elements are not broken by the counter electromotive force generated from the motor M. The speed control of the motor is performed by the PWM (pulse width modulation) control using a signal from the CPU 10.

Zener diodes ZD1 to ZD4 are preferably provided between the gates-sources of the MOS1 to MOS4, respectively, in order to protect the MOSFET elements from an over voltage. Since each of the zener diodes ZD1 to ZD4 breaks down in response to a predetermined voltage, it becomes possible to apply a constant voltage to the gates thereof from the high-side and low-side drivers. In this respect, the protection circuits are not limited to the zener diodes and other protection circuits may be used therefor.

A MOS5 is an N channel MOSFET for preventing a reverse current at the time of reversely coupling a DC power source such as a battery. The MOS5 is a common drain type which connection is in opposite to the normal type. Further, since the gate of the MOS5 is coupled to the DC power source such as a battery, the MOS5 is always biased and so in an on state. However, when the DC power source such as a battery is reversely coupled, since the voltage is not applied to the gate of the MOS5, the MOS5 is turned off. Thus, the breakage of the MOS1 to MOS4 constituting the H bridge circuit and other circuits can be prevented.

The source of the MOS5 is coupled to the A/D input port of the CPU 10 or the comparator. The CPU 10 monitors the source voltage of the MOS5 thereby to detect a lock current of the motor M at the time of using for a power window or an excess current at the time of the short-circuit of a load of the motor M. When the CPU 10 detects such a state, the CPU performs the post processing according to the detected state. For example, when the excess current is detected, the CPU outputs to the driver IC 40 a control signal for turning off both the MOS1 and the MOS3. When the comparator is used, the comparator compares the source voltage being inputted with a predetermined threshold value thereby to detect the lock current or the excess current. The result of the detection is outputted to the CPU 10, and then the CPU 10 performs the post processing in accordance with the result of the detection. In this manner, according to such a configuration that the drain of the MOSFET is grounded and the source voltage thereof is monitored, the shunt resistor of the related technique can be eliminated.

A zener diode ZD5 is preferably connected between the gate and the source of the MOS5. A parasitic diode D5 is connected between the drain and the source of the MOS5. The functions of the zener diode ZD5 and the parasitic diode D5 are same as those explained above in relation to the MOS1 to the MOS4.

Each of the transistors Tr1 and Tr2 is a transistor for preventing a passing current. When both the MOS1 and the MOS2 are turned on, no current flows into the motor M and the current from the power source directly passes to the ground. The transistor Tr1 is provided in order to prevent such a phenomenon. The transistor Tr2 is provided for the same purpose as the transistor Tr1 thereby to prevent such a phenomenon that both the MOS3 and the MOS4 are turned on and the current from the power source directly passes to the ground.

The collector of the transistor Tr1 is coupled to a signal line for driving the gate which applies a signal from the low-side driver to the gate of the MOS2. The base of the transistor Tr1 is coupled to a signal line for driving the gate which applies a signal from the high-side driver to the gate of the MOS1. When the high-side driver applies a high level signal to the gate of the MOS1 in order to turn it on, the base of the transistor Tr1 is turned on. Thus, even if a high level signal is applied to the MOS2 due to any reason such as a noise in this state, since the transistor Tr1 is in an on state, such a signal is grounded and so the MOS2 is never turned on. Since the transistor Tr2 is arranged in the same manner as the transistor Tr1, when the high-side driver applies a high level signal to the gate of the MOS3, the transistor Tr2 is turned on. Thus, even if a high level signal is applied to the MOS4, such a signal is grounded and so the MOS4 is never turned on.

Next, the operation of the reversible motor driving circuit according to the embodiment will be explained. FIG. 2 is timing charts for explaining the typical operation of the reversible motor driving circuit according to the embodiment. FIG. 2A shows a chart showing the brake mode of the motor M. When braking the motor in the rotation state of the motor M, the CPU 10 outputs control signals to the driver IC 40 so as to turn off both the MOS1 and the MOS3 and turn on both the MOS2 and the MOS4. The high-side driver of the driver IC 40 applies a low level signal to the gates of the MOS1 and the MOS3 to turn off the MOS1 and the MOS3. In contrast, the low-side driver applies a high level signal to the gates of the MOS2 and the MOS4 to turn on the MOS2 and the MOS4. This state is the brake mode.

In the brake mode, both the MOS1 and the MOS3 are turned off in order not to flow a current from the DC power source to the motor M, whilst both the MOS2 and the MOS4 are turned on in order to flow the residual electric charges of the motor M and the H bridge circuit to the ground. A standby signal applied from the CPU 10 to the driver IC 40 is a high level signal.

Next, FIG. 2B is a chart showing the case of rotating the motor M in the forward direction. When rotating the motor M in the forward direction from the brake mode, the CPU 10 outputs a control signal for turning off the MOS2 and then outputs a control signal for turning on the MOS1 upon the lapse of an ON delay time td after the turning off of the MOS2. When stopping the forward rotation of the motor M, the CPU outputs a control signal for turning off the MOS1 and then outputs a control signal for turning on the MOS2 upon the lapse of the ON delay time td after the turning off of the MOS1.

The low-side driver of the driver IC 40 applies a low level signal to the gate of the MOS2 in the on state of the MOS4 thereby to turn off the MOS2. The high-side driver applies, in the off state of the MOS3, a high level signal to the gate of the MOS1 upon the lapse of the ON delay time td after the turning off of the MOS2 thereby to turn on the MOS1.

When stopping the forward rotation of the motor M, the high-side driver applies a low level signal to the gate of the MOS1 in the off state of the MOS3 thereby to turn off the MOS1. The low-side driver applies, in the on state of the MOS4, a high level signal to the gate of the MOS2 upon the lapse of the ON delay time td after the turning off of the MOS1 thereby to turn on the MOS2.

In this manner, in order to prevent the generation of the passing current passing through the MOS1 and the MOS2, the MOS1 is not turned on simultaneously with the turning off of the MOS2 but turned on after the lapse of the ON delay time td. By the same reason, the MOS2 is not turned on simultaneously with the turning-off of the MOS1 but turned on after the lapse of the ON delay time td. The standby signal from the CPU 10 to the driver IC 40 is a high level signal.

Next, FIG. 2C is a chart showing the case of rotating the motor M in the reverse direction. When rotating the motor M in the reverse direction from the brake mode, the CPU 10 outputs a control signal for turning off the MOS4 and then outputs a control signal for turning on the MOS3 upon the lapse of an ON delay time td after the turning off of the MOS4. When stopping the reverse rotation of the motor M, the CPU outputs a control signal for turning off the MOS3 and then outputs a control signal for turning on the MOS4 upon the lapse of the ON delay time td after the turning off of the MOS3.

When starting the reverse rotation, the low-side driver of the driver IC 40 applies a low level signal to the gate of the MOS4 in the on state of the MOS2 thereby to turn off the MOS4. The high-side driver applies, in the off state of the MOS1, a high level signal to the gate of the MOS3 upon the lapse of the ON delay time td after the turning off of the MOS4 thereby to turn on the MOS3.

When stopping the reverse rotation of the motor M, the high-side driver applies a low level signal to the gate of the MOS3 in the off state of the MOS1 thereby to turn off the MOS3. The low-side driver applies, in the on state of the MOS2, a high level signal to the gate of the MOS4 upon the lapse of the ON delay time td after the turning off of the MOS3 thereby to turn on the MOS4.

In this manner, in order to prevent the generation of the passing current passing through the MOS3 and the MOS4, the MOS3 is not turned on simultaneously with the turning off of the MOS4 but turned on after the lapse of the ON delay time td. By the same reason, the MOS4 is not turned on simultaneously with the turning-off of the MOS3 but turned on after the lapse of the ON delay time td. The standby signal from the CPU 10 to the driver IC 40 is a high level signal.

Next, FIG. 2D is a chart showing the standby mode of the motor M. When shifting the motor M to the standby mode, the CPU 10 sets the standby signal to be outputted to the driver IC 40 to a low level. Unlike the brake mode, in the standby mode, not only the MOS1 and the MOS3 are turned off but also the MOS2 and the MOS4 are turned off. Thus, since it is not necessary to apply a high level signal to the gates of the MOS1 to MOS4 from the driver IC, an amount of consumption electric power can be reduced.

Further, a standby terminal dedicated for inputting the standby signal is preferably provided at the driver IC 40. In this case, when a low level signal is inputted into the standby terminal from the CPU 10, the driver IC 40 performs the processing of shifting to the standby mode even if any signal is inputted into the terminals of the MOS1 to MOS4.

It will be understood by those skilled in the art that although the foregoing description has been made on the preferred embodiments of the invention, the invention is not limited thereto and that various changes and modifications may be made in the invention without departing from the spirit of the invention and scope of the appended claims.

What is claimed is:

1. A reversible motor driving circuit, comprising:
   a motor, capable of rotating in forward and reverse directions;
   two high-side semiconductor switching elements, coupled to a DC power source, and switching to selectively supply a current for forward rotation and a current for reverse rotation to the motor;
   two low-side semiconductor switching elements, switching to selectively ground the current for forward rotation and the current for reverse rotation flowing into the motor; and
   a field effect transistor, provided between the ground and an H bridge circuit formed by the two high-side semiconductor switching elements and the two low-side semiconductor switching elements,
   wherein a drain of the field effect transistor is grounded and a gate thereof is coupled to the DC power source.

2. The reversible motor driving circuit as set forth in claim 1, further comprising:
- a high-side driver, applying an ON/OFF signal to the two high-side semiconductor switching elements so as to drive the two high-side semiconductor switching elements in accordance with the ON/OFF signal;
- a low-side driver, applying an ON/OFF signal to the two low-side semiconductor switching elements so as to drive the two low-side semiconductor switching elements in accordance with the ON/OFF signal; and
- a controller, outputting to the high-side driver and the low-side driver a control signal instructing at least one of a forward rotation of the motor, a reverse rotation of the motor and a brake mode,
- wherein the controller monitors a source voltage of the field effect transistor, and outputs a control signal instructing the brake mode to the high-side driver when the controller detects an excess current, and
- wherein the high-side driver applies an off signal to the two high-side semiconductor switching elements when the high-side driver receives the control signal instructing the brake mode.

3. The reversible motor driving circuit as set forth in claim 2, wherein the controller monitors the source voltage of the field effect transistor; and
wherein the controller outputs a control signal for executing a preset post-processing regarding a lock current to at least one of the high-side driver and the low-side driver when the lock current representing a lock state of the motor is detected.

4. The reversible motor driving circuit as set forth in claim 2, further comprising a transistor having a base to which an output voltage of the high-side driver is inputted and a collector to which an output voltage of the low-side driver is inputted.

5. The reversible motor driving circuit as set forth in claim 2, wherein when rotating the motor in a forward direction or a reverse direction, the high-side driver turns on the high-side semiconductor switching element coupled in series with the low-side semiconductor switching element upon lapse of a predetermined time period after the low-side driver turns off the low-side semiconductor switching element.

6. The reversible motor driving circuit as set forth in claim 2, wherein when stopping rotation of the motor, the low-side driver turns on the low-side semiconductor switching element coupled in series with the high-side semiconductor switching element upon lapse of a constant time period after the high-side driver turns off the high-side semiconductor switching element.

* * * * *